United States Patent [19]

Koleyni

[11] Patent Number: 4,912,452
[45] Date of Patent: Mar. 27, 1990

[54] ISDN QUICK CONNECT TERMINATING RESISTOR

[75] Inventor: Ghassem Koleyni, Kanata, Canada

[73] Assignee: Northern Telecom Limited, Montreal, Canada

[21] Appl. No.: 281,351

[22] Filed: Dec. 8, 1988

[51] Int. Cl.4 .......................................... H01C 13/00
[52] U.S. Cl. .................................... 338/221; 338/333; 439/620
[58] Field of Search ............... 338/221, 322, 333, 334, 338/49; 219/541; 333/22 R, 127, 101; 439/620, 719; 361/119

[56]  References Cited

U.S. PATENT DOCUMENTS

| | | | |
|---|---|---|---|
| 3,360,747 | 12/1967 | Lancaster | 333/127 |
| 3,525,056 | 8/1970 | Qurashi | 333/22 R |
| 3,529,264 | 9/1970 | Lancaster | 333/101 |
| 4,838,813 | 6/1989 | Pauza et al. | 333/22 R |

FOREIGN PATENT DOCUMENTS 2655841  6/1978  Fed. Rep. of Germany ...... 338/221

OTHER PUBLICATIONS

A. L. Balan, *IBM Technical Disclosure Bulletin*, "Pluggable Terminator Resistor Pack", vol. 20, No. 10, Mar. 1978, p. 3859.

*Primary Examiner*—C. L. Albritton
*Attorney, Agent, or Firm*—Jean-Pierre Fortin

[57]  ABSTRACT

With the deployment of ISDN within a building, a resistor box is usually required, at each distribution frame, between the first and second set of cross-connect connectors in order to maintain a balanced loop. In the present invention, a quick connect terminating resistor for use with cross-connect type of connectors is disclosed. It is used for eliminating the use of the resistor box. The quick connect terminating resistor is comprised of a body having a connecting end, conductor portions on said body at said connecting end adapted to mate with a pair of terminals of said cross-connect type connector and resistor means connected to said conductor portions for providing a terminating resistance across said pair of terminals of said cross-connect type connector.

10 Claims, 5 Drawing Sheets

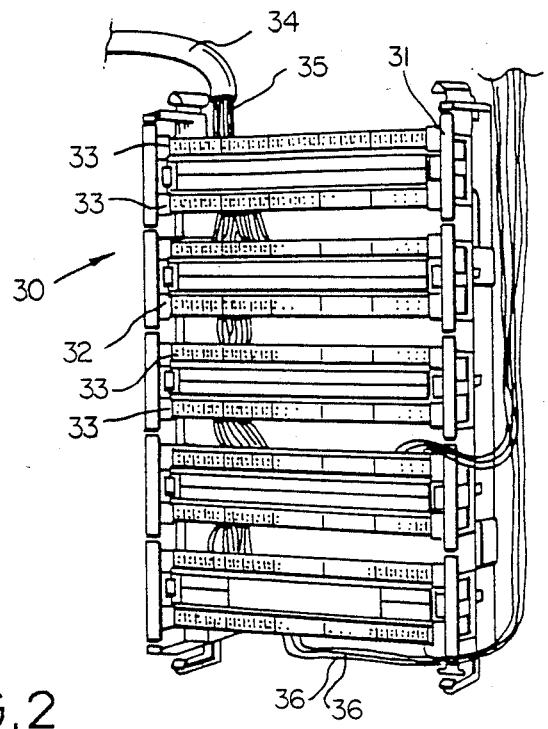
FIG.2
PRIOR ART
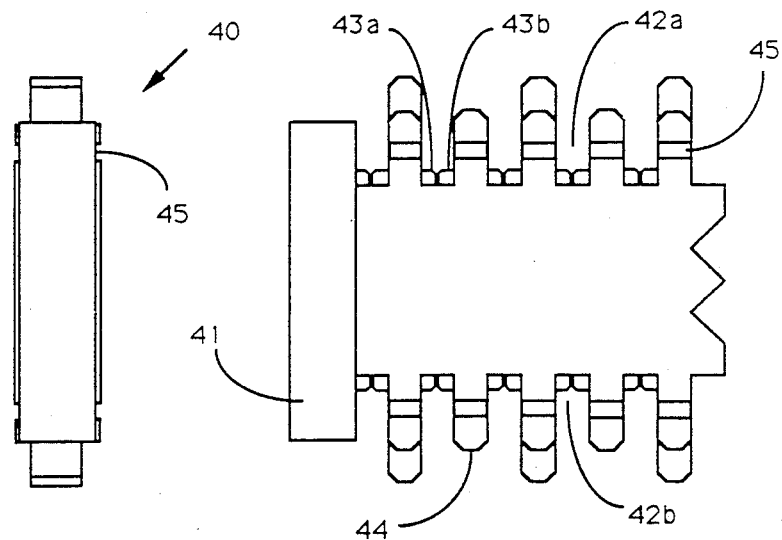
FIG. 3a
PRIOR ART
FIG. 3b
PRIOR ART

ISDN QUICK CONNECT TERMINATING RESISTOR

This invention relates to cross-connect connectors and more particularly to a terminating resistor for use therewith.

In a telecommunication system, an incoming cable to a customer's premises i connected to a distribution cable for distribution of the electrical wiring to access points and terminals within the premises. The distribution cable may itself be connected to a further cable or to series or parallel cables to assist in the wiring distribution. At each connection location between cables, it is now common practice to use a distribution frame which detachably carries connectors for electrically connecting the conductor wires of one cable with those of another or others. These connectors are normally of a construction referred to as "cross-connect connectors" in that each connector comprises a dielectric body with two spaced rows of electrical terminals held by the body. The terminals of one row are interconnected electrically and in desired fashion with those of the other row through the dielectric body.

According to normal practice, at each distribution frame, an incoming cable is brought into an input location of the frame and its conductor wires are distributed as required to the various positions for mounting to a first and second set of cross-connect connectors and through to end use equipment, such as telephones and data processing terminals. For ISDN deployment within a building, a resistor box is used between the first and second set of cross-connect connectors in order to maintain a balanced loop. In particular, a conductor wire is led from each unused terminal of each cross-connect connector to the resistor box. Since the whole connection procedure is manual, it is an arduous and lengthy process particularly as there may be as many as twenty-five terminals along each row of a connector and some distribution frames have ten or more connectors.

The present invention basically provides a quick connect terminating resistor for use across terminals of cross-connect connectors and which eliminates the need for a resistor box and its associated wiring. The invention not only simplifies the initial installation but makes the modification to install additional telephones and lines much easier and less time consuming.

Accordingly, the present invention provides a quick connect terminating resistor for use with cross-connect type of connectors, comprising: a body having a connecting end; conductor portions on said body at said connecting end adapted to mate with a pair of terminals of said cross-connect type connector; and resistor means connected to said conductor portions for providing a terminating resistance across said pair of terminals of said cross-connect type connector.

BRIEF DESCRIPTION OF THE DRAWINGS

Particular embodiments of the invention will be understood in conjunction with the accompanying drawings, in which:

FIG. 2 is an isometric view of a distribution frame and cross-connect connector assembly according to the prior art;

FIGS. 3a and 3b are side and front views respectively of a typical cross-connect connector;

BRIEF DESCRIPTION OF THE PREFERRED EMBODIMENT

Figure 1:
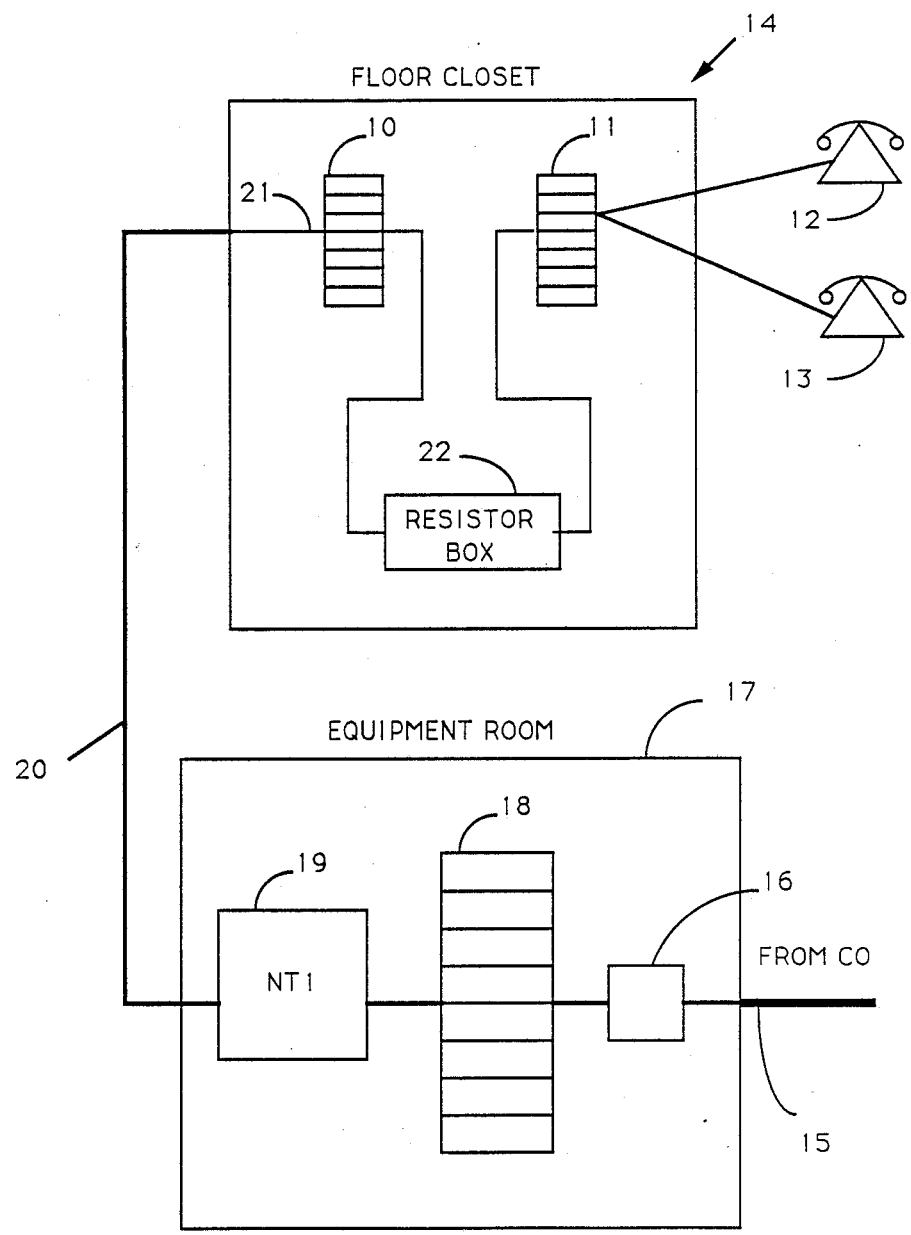
FIG. 1 is an illustration of a prior art connecting arrangement used in a typical distribution frame.

As shown in FIG. 1, typical distribution frames 10 and 11 are used to assist in the wiring distribution to access points and terminals 12 and 13 within the premises. Depending on the size of the building, the distribution frames are either located in the basement or on each floor of an office building in what is commercially referred to as a floor closet 14.

In a typical communication system, an incoming cable from the central office (CO) 15 enters the premises through a protector 16 in equipment room 17. The incoming cable is teen distributed to various offices by means of a main distribution frame 18 and via a network termination 19. The network termination outgoing cable 20 is then directed to the floor closet 14. The outgoing cable 20 is then brought into an input location of the frame 10 and its conductor wires are distributed as required to the various positions for mounting to the crossconnect connectors. In FIG. 1, only one distribution cable 21 is shown for simplicity. A resistor box 22 is used for each network termination 19. Accordingly, if only a few distribution cables are used at the distribution frame 10 or if only a few access points or terminals are used at frame 11, then a number of wires equivalent to the number of unused distribution wires will be required between the distribution frame and the resistor box 22. This not only increases the complexity of the task but also the associated installation time.

FIG. 2 is an isometric view of a typical distribution frame and wiring assembly which can be used with the present invention. It is comprised of a distribution frame 30 having a plurality of mounting shelves 31 for detachably holding a plurality of cross-connect connectors 32 in predetermined locations. In the embodiment of FIG. 2, the distribution frame 3 has five mounting shelves, each comprised of a pair of axially aligned and spaced rows of cross-connect connectors 33. In a finished assembly, an incoming cable 34 has its insulated conductor wires 35 separated into groups and these groups are passed to the cross-connect connectors 32, one group to each connector. A portion of outgoing wires 36 are distributed to access points or terminals that are in use (i. e. 12 and 13) and the remaining wires are distributed to resistor box 20 to maintain a balanced loop for those terminals that are not in use.

FIGS. 3a and 3b show a cross-connect connector 40. It is comprised of a substantially planar body 41 made of dielectric material having along each edge a row of terminals 42a and 42b. In this known connector structure, each of the terminals comprises two opposed electrically conductive portions 43a and 43b arranged on either side of a molded groove 44 in an edge of the body 41. These conductor portions act to cut into the insulating material surrounding a conductor wire when the wire is forced into the groove so that the conductor portions electrically contact the conductor wire. Such terminals are normally referred to as insulation displacement terminals. This cross-connect connector structure is used for the distribution of electrical wiring to access points and terminals within a customer's premises. In this structure, terminals of one row e.g. terminals 42a, are connected to conductor wires of one cable or group of cables and terminals of the other row of terminals, e.g. terminals 42b, are connected to another cable or group.

In this prior art arrangement, a lengthy assembly procedure of outgoing wires 36 is necessary between the distribution frame and a resistor box. Also, because the location of the distribution frame itself may not be easily accessible, the assembly of the wires into the cross-connect connectors may be a difficult operation for the assembler.

With the present invention however, the above disadvantages are avoided or minimized.

Figure 4A:
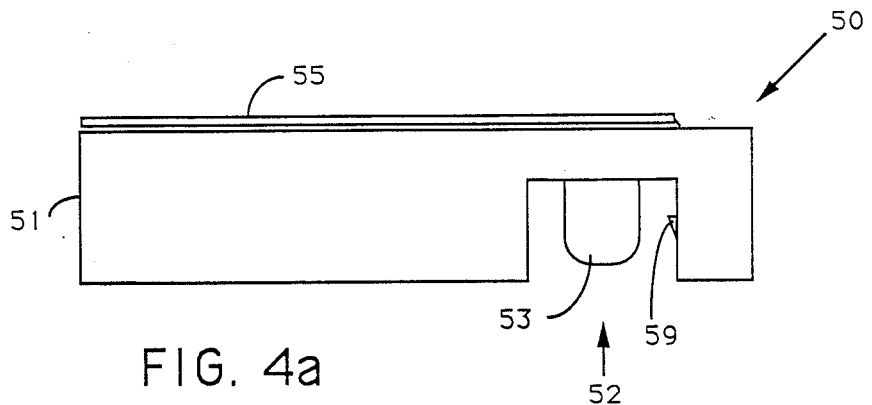
FIGS. 4a and 4b are side and bottom views respectively of the quick connect terminating resistor according to a first embodiment of the invention.
Figure 4B:
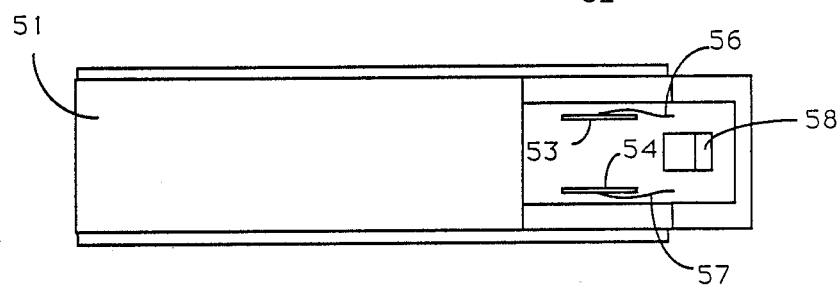

In a first embodiment as shown in FIGS. 4a and 4b, a quick connect terminating resistor 50 replaces the need for a resistor box and its associated wiring. It is comprised of a generally planar body 51 having a connecting end 52. A pair of conductor portions or blades 53 and 54 are provided at the connecting end 52 and are adapted to mate with a pair of terminals on one edge of the cross-conect 10 connectors. A resistive element 55 is conected between conductor portions 53 and 54 to provide a terminating resistance across the pair of terminals on the cross-connect connector. Resistive element 55 can consist of a planar ceramic resistor and should preferably include a fuse or other protection circuitry for inside and outside plant protection. For example, a capacitor can be incorporated with the planar resistor as part of the protection circuitry. Conductor portions 53 and 54 are connected to resistive element 55 by means of leads 56 and 57 respectively. Retaining means 58 can be provided to latch the terminating resistor 50 to the cross-connect connector. The retaining means 58 can consist of a resilient finger having a protruding inclined edge 59 which latches against an abutment shown in FIGS. 3a and 3b as reference numeral 45.

Figure 5A:
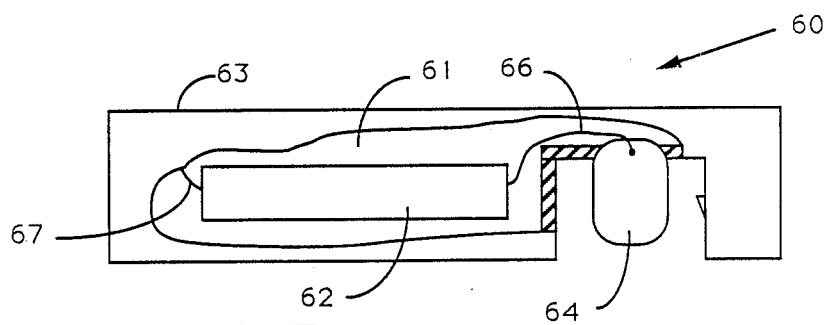
FIGS. 5a and 5b are a partially-sectioned side view and a bottom view respectively, of a quick connect terminating resistor according to a second embodiment of the invention.
Figure 5B:
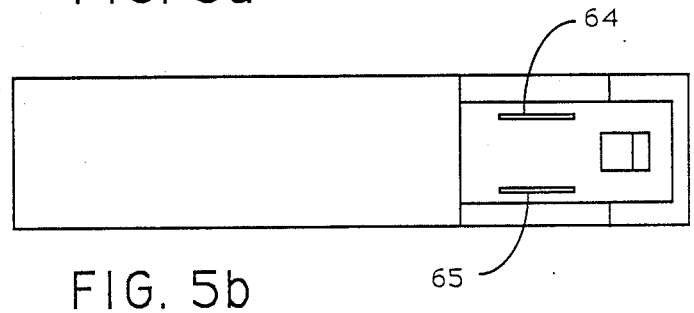

The embodiment of FIGS. 5a and 5b is similar to the embodiment of FIGS. 4a and 4b. However, in the embodiment of FIGS. 5a and 5b the terminating resistor 60 is provided with a cavity 61 at one end thereof to receive a resistive element 62. With this arrangement, the body 63 should be made of heat dissipating material if resistive element 62 is to generate heat. The resistive element 62 is similarly connected between the two conductor portions 64 and 65 by means of leads 66 and 67 respectively.

Figure 6A:
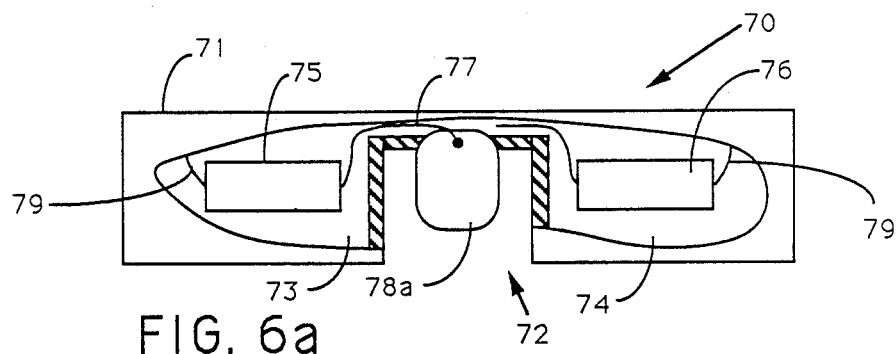
FIGS. 6a and 6b are a partially-sectioned side view and a bottom view respectively of a quick connect terminating resistor according to a third embodiment of the invention.
Figure 6B:
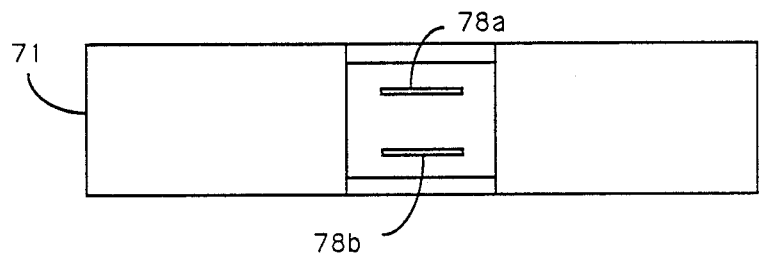

FIGS. 6a and 6b represent another embodiment of the present invention. The terminating resistor 70 has a similar generally planar body 71. However, the connecting portion 72 is positioned centrally thereof. In this embodiment, separate cavities 73 and 74 are located at each end of the terminating resistor. Resistive elements 75 and 76 are positioned therein. A connecting lead 77 connects conductor portion 78a to resistive element 75 which is connected in series with resistive element 76 by means of lead 79. Resistive element 76 is connected to the opposite conductor portion 78b.

Figure 7A:
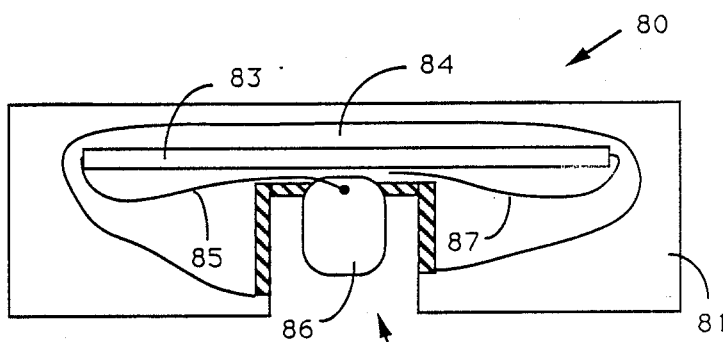
FIGS. 7a and 7b are a partially-sectioned side view and a bottom view respectively of a quick connect terminating resistor according to a fourth embodiment of the invention.
Figure 7B:
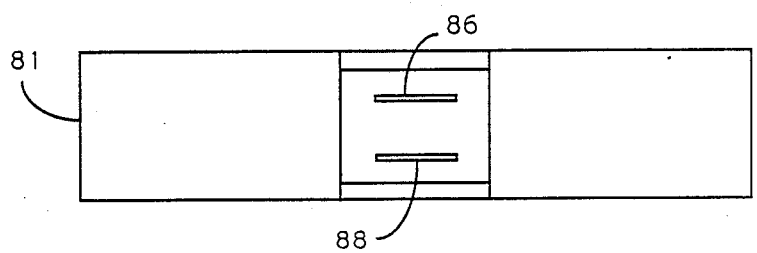
Figure 8:
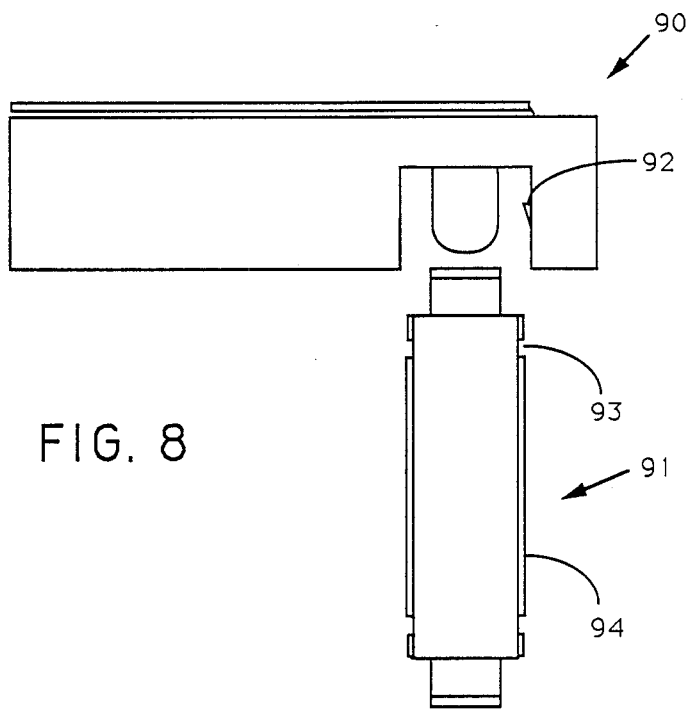
FIG. 8 is an illustrative view showing the positioning of the terminating resistor with respect to the cross-connect connector.

FIGS. 7a and 7b represent yet another embodiment of the present invention. The terminating resistor 80 also has a generally planar body 81 and a centrally positioned connecting portion 82. However, the resistive element 83 is enclosed in a single cavity 84. A connecting lead 85 connects conductor portion 86 to resistive element 83 and connecting lead 87 connects the other end of resistive element 83 to the opposite conductor portion or blade 88.

In operation, when an unused terminal of a cross-connect connector is required to be connected to a terminating load, a quick connect terminating resistor such as shown n FIG. 7 at reference numeral 90 is inserted over the particular terminal pair of cross-connect connector 91. The terminating resistor is pressed onto the connector until the retaining latch 92 comes in abutment with groove 93 on a side edge 94 of connector 91. Because of their generally planar shape, a number of terminating resistors can be placed and oriented one adjacent another.

As shown from the above embodiments, it is a simple matter to provide a terminating impedance across one or any pair of connectors thereby simplifying the wiring in a distribution frame itself.

What is claimed is:

1. A quick connect terminating resistor for use with cross-connect type connectors, comprising:
    a body having a connecting end and two opposed grooves on either side edge of said body at said connecting end adapted to be oriented across said cross-connect connector such that a similar terminating resistor can be placed on an adjacent pair of terminals in a row;
    conductor portions on said body at said connecting end adapted to mate with a pair of terminals of said cross-connect type connector; and
    resistor means connected to said conductor portions for providing a terminating resistance across said pair of terminals of said cross-connect type connector.

2. A quick connect terminating resistor as defined in claim 1, wherein said conductor portions comprises two opposed, spaced apart, conductor portions arranged on either side of said grooves, each conductor portion being adapted to mate with one terminal of said pair of insulation displacement terminals.

3. A quick connect terminating resistor as defined in claim 2, wherein said resistor means further comprises protection circuitry means.

4. A quick connect terminating resistor as defined in claim 3, wherein said resistor means comprises a resistor disposed on said body and having leads to connect said resistor between said conductor portions, thereby providing a terminating resistance across said pair of terminals.

5. A quick connect terminating resistor as defined in claim 3, wherein said resistor means is disposed in a cavity formed within said body and connected between said conductor portions, said resistor means and body being made of heat dissipating material.

6. A quick, connect terminating resistor as defined in claim 5, wherein said connecting portion of said body is disposed at one end thereof and said resistor means at the other end thereof.

7. A quick connect terminating resistor as defined in claim 5, wherein said connecting end is disposed centrally of said body.

8. A quick connect terminating resistor as defined in claim 7, wherein said connecting portion is disposed centrally of said body with a first resistor means placed in a cavity at a first end and a second resistor means placed in a cavity at a second end thereof, said first resistor means being connected between a first conductor portion, said second resistor means and a second conductor portion.

9. A quick connect terminating resistor is defined in claim 4, wherein said resistor consists of a planar ceramic type resistor.

10. A quick connect terminating resistor as defined in claim 4, wherein said body is further provided with retaining means which latches against an abutment surface of one side wall of said cross-connect type connector.

* * * * *